United States Patent
Dhrubo et al.

(10) Patent No.: US 12,529,843 B2
(45) Date of Patent: Jan. 20, 2026

(54) PHOTONICS CHIP STRUCTURES INCLUDING A REFLECTOR

(71) Applicant: GlobalFoundries U.S. Inc., Malta, NY (US)

(72) Inventors: Md Nabil Shehtab Dhrubo, Troy, NY (US); Andreas D. Stricker, Essex Junction, VT (US); Alexander Derrickson, Saratoga Springs, NY (US); Subramanian Krishnamurthy, Ballston Lake, NY (US); Yusheng Bian, Ballston Lake, NY (US); Judson R. Holt, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 295 days.

(21) Appl. No.: 18/242,364

(22) Filed: Sep. 5, 2023

(65) Prior Publication Data

US 2025/0076574 A1    Mar. 6, 2025

(51) Int. Cl.
| | | |
|---|---|---|
| *G02B 6/122* | (2006.01) | |
| *G02B 6/12* | (2006.01) | |
| *G02B 6/13* | (2006.01) | |
| *G02B 6/42* | (2006.01) | |

(52) U.S. Cl.
CPC ......... *G02B 6/122* (2013.01); *G02B 6/12004* (2013.01); *G02B 6/1228* (2013.01); *G02B 6/13* (2013.01); *G02B 6/4214* (2013.01); *G02B 2006/12104* (2013.01); *G02B 2006/12121* (2013.01)

(58) Field of Classification Search
CPC .... G02B 6/12004; G02B 6/13; G02B 6/4214; G02B 6/122; G02B 6/1228
See application file for complete search history.

(56) References Cited

U.S. PATENT DOCUMENTS

| | | |
|---|---|---|
| 10,157,947 B2 | 12/2018 | Chen et al. |
| 11,152,520 B1 | 10/2021 | Adusumilli et al. |
| 11,316,064 B2 | 4/2022 | Adusumilli et al. |
| 2007/0253661 A1* | 11/2007 | Black ................ G02B 6/136 385/11 |
| 2014/0159183 A1 | 6/2014 | Na |

OTHER PUBLICATIONS

Pellacani P. et al., "Porous Silicon Bragg Reflector and 2D Gold-Polymer Nanograting: A Route Towards a Hybrid Optoplasmonic Platform." Nanomaterials (Basel). Jul. 16, 2019;9(7):1017. doi: 10.3390/nano9071017. PMID: 31315233; PMCID: PMC6669865.

(Continued)

*Primary Examiner* — Michael P Mooney
(74) *Attorney, Agent, or Firm* — Thompson Hine LLP; Anthony Canale

(57) ABSTRACT

Photonics chip structures including a reflector and methods of forming such structures. The photonics chip structure comprises a first waveguide core, a second waveguide core adjacent to the first waveguide core, and a reflector including a plurality of metal contacts over a portion of the first waveguide core. The second waveguide core is configured to couple light to the first waveguide core, and the metal contacts are configured to reflect the light.

20 Claims, 8 Drawing Sheets

(56) References Cited

OTHER PUBLICATIONS

A. Grieco et al., "Optical Bistability in a Silicon Waveguide Distributed Bragg Reflector Fabry-Pérot Resonator," in Journal of Lightwave Technology, vol. 30, No. 14, pp. 2352-2355, Jul. 15, 2012, doi: 10.1109/JLT.2012.2197731.

Sooseok Kang et al., "Cavity-enhanced InGaAs photo-FET with a metal gate reflector fabricated by wafer bonding on Si," Optics Express 29, 42630-42641 (2021).

An, Shu et al., "High-Sensitivity and Mechanically Compliant Flexible Ge Photodetectors with a Vertical p-i-n Configuration." ACS Applied Electronic Materials. 3(4), 1780-1786. https://dx.doi.org/10.1021/acsaelm.1c0054 (2021).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Chowdhury et al., "High Performance Avalanche Photodiode in a Monolithic Silicon Photonics Technology," 2022 Optical Fiber Communications Conference and Exhibition (OFC), San Diego, CA, USA, 2022, pp. 1-3.

\* cited by examiner ic chip structures including a reflector and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as a laser or an optical fiber.

A reflector may be incorporated as a photonic component into a photonic integrated circuit. A distributed Bragg reflector is a common type of reflector that may be used to enhance the coupling efficiency of an optical component. However, a complex process flow is required to form the vertical stack of multiple layers of a distributed Bragg reflector.

Improved photonics chip structures including a reflector and methods of forming such structures are needed.

SUMMARY

In an embodiment of the invention, a photonics chip structure comprises a first waveguide core, a second waveguide core adjacent to the first waveguide core, and a reflector including a plurality of metal contacts over a portion of the first waveguide core. The second waveguide core is configured to couple light to the first waveguide core, and the plurality of metal contacts are configured to reflect the light.

In an embodiment of the invention, a photonics chip structure comprises a waveguide core and a Fabry-Perot laser diode. The Fabry-Perot laser diode comprises a gain medium over the waveguide core, and the gain medium has a first end and a second end opposite from the first end. The photonics chip structure further comprises a reflector including a plurality of metal contacts over a portion of the waveguide core that is adjacent to the first end of the gain medium.

In an embodiment of the invention, a method of forming a photonics chip structure comprises forming a first waveguide core and forming a second waveguide core adjacent to the first waveguide core. The second waveguide core is configured to couple light to the first waveguide core. The method further comprises forming a reflector including a plurality of metal contacts over a portion of the first waveguide core. The metal contacts are configured to reflect the light.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
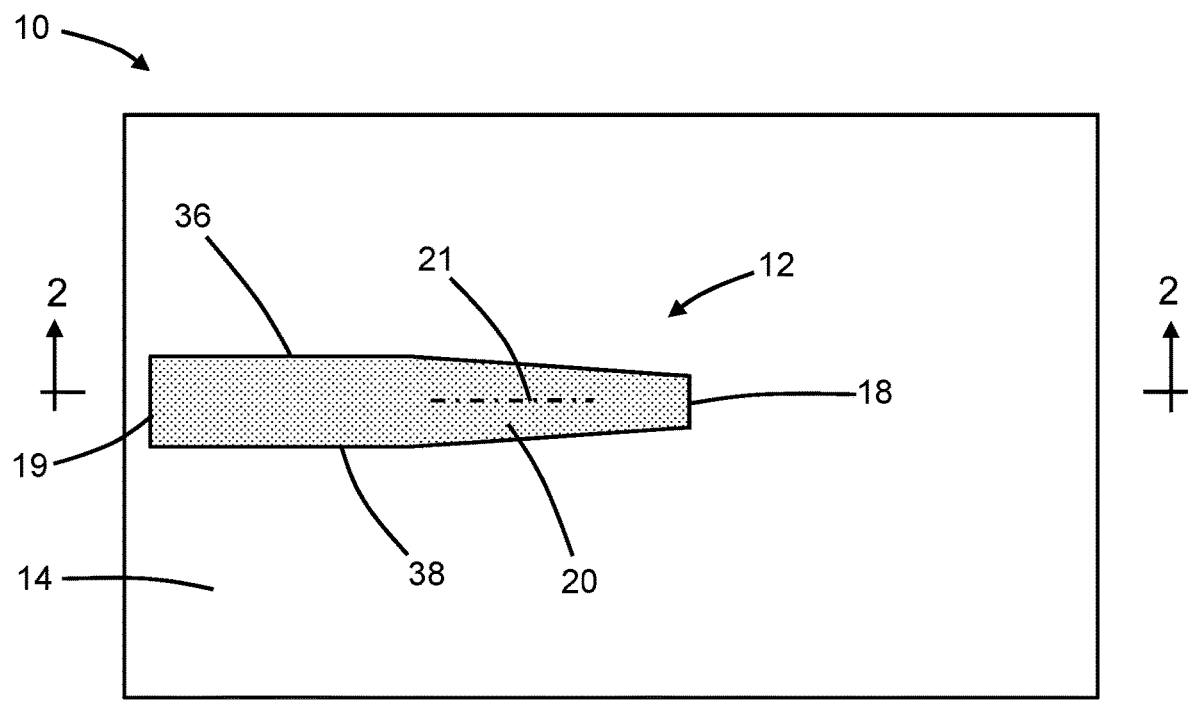
FIG. 1 is a top view of a structure at an initial fabrication stage of a processing method in accordance with embodiments of the invention.
Figure 2:
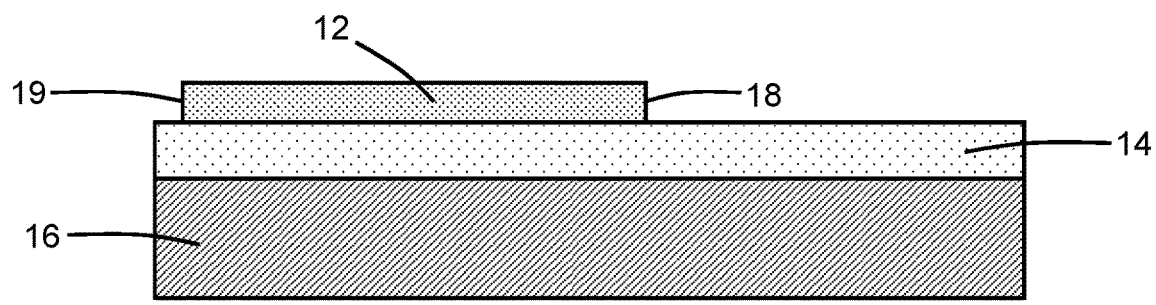
FIG. 2 is a cross-sectional view taken generally along line 2-2 in FIG. 1.

With reference to FIGS. 1, 2 and in accordance with embodiments of the invention, a structure 10 for a photonics chip includes a waveguide core 12 that is disposed on, and over, a dielectric layer 14 and a substrate 16. In an embodiment, the dielectric layer 14 may be comprised of a dielectric material, such as silicon dioxide, and the substrate 16 may be comprised of a semiconductor material, such as single-crystal silicon. In an embodiment, the dielectric layer 14 may be a buried oxide layer of a silicon-on-insulator substrate. The waveguide core 12 is separated from the substrate 16 by the dielectric material of the intervening dielectric layer 14. In an alternative embodiment, one or more additional dielectric layers comprised of, for example, silicon dioxide may be disposed between the waveguide core 12 and the upper surface of the dielectric layer 14.

In an embodiment, the waveguide core 12 may be comprised of a material having a refractive index that is greater than the refractive index of silicon dioxide. In an embodiment, the waveguide core 12 may be comprised of a semiconductor material, such as single-crystal silicon, amorphous silicon, or polysilicon. In an alternative embodiment, the waveguide core 12 may be comprised of a dielectric material, such as silicon nitride, silicon oxynitride, or aluminum nitride. In alternative embodiments, other materials, such as a III-V compound semiconductor, may be used to form the waveguide core 12.

In an embodiment, the waveguide core 12 may be formed by patterning a layer with lithography and etching processes. In an embodiment, an etch mask may be formed by a lithography process over the layer, and unmasked sections of the layer may be etched and removed with an etching process. In an embodiment, the waveguide core 12 may be formed by patterning the semiconductor material (e.g., single-crystal silicon) of the device layer of a silicon-on-insulator substrate. In an embodiment, the waveguide core 12 may be formed by patterning a deposited layer comprised of its constituent material (e.g., silicon nitride).

The waveguide core 12 may have opposite sidewalls 36, 38, a tapered section 20, an end 18 that terminates the tapered section 20, and an end 19 opposite from the end 18. The tapered section 20 extends lengthwise along a longitudinal axis 21 with a width dimension that increases with increasing distance along the longitudinal axis 21 from the end 18. In an embodiment, the width dimension of the tapered section 20 may increase linearly with increasing distance from the end 18. In an alternative embodiment, the width dimension of the tapered section 20 may vary based on a non-linear function, such as a quadratic function, a cubic function, a parabolic function, a sine function, a cosine function, a Bezier function, or an exponential function. In an embodiment, the tapered section 20 may include a single stage of tapering characterized by a taper angle. In an alternative embodiment, the tapered section 20 may taper in multiple stages each characterized by a different taper angle.

Figure 3:
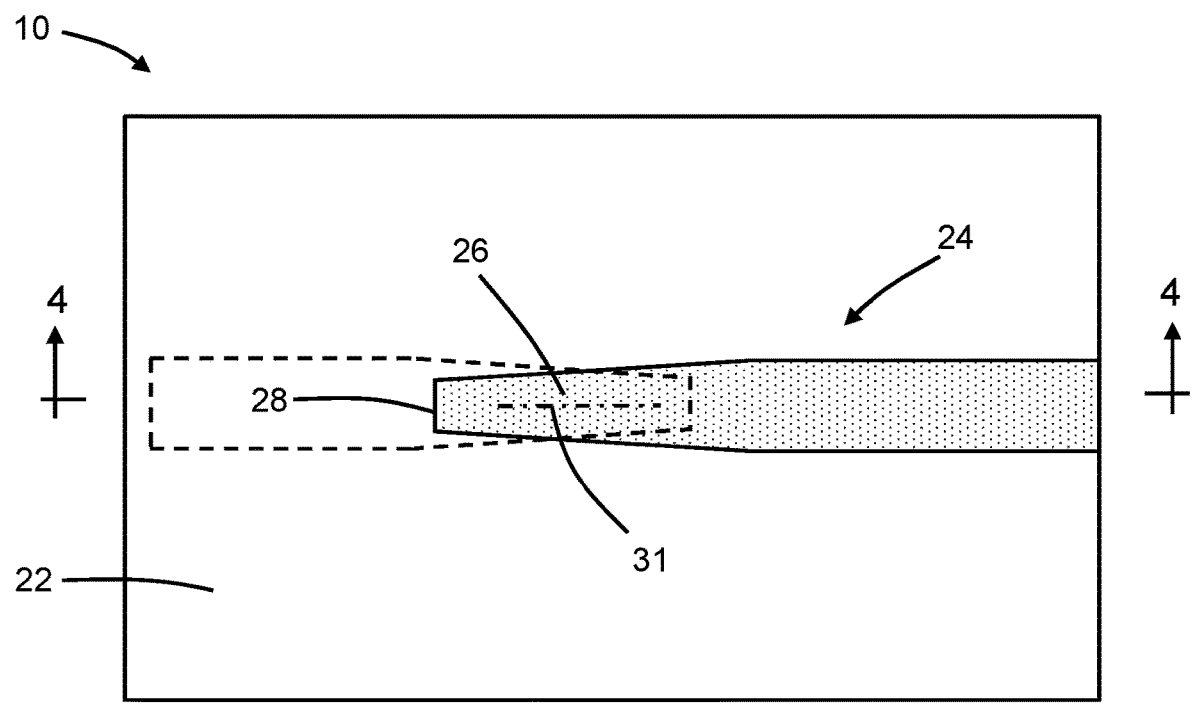
FIG. 3 is a top view of the structure at a fabrication stage of the processing method subsequent to FIGS. 1, 2.
Figure 4:
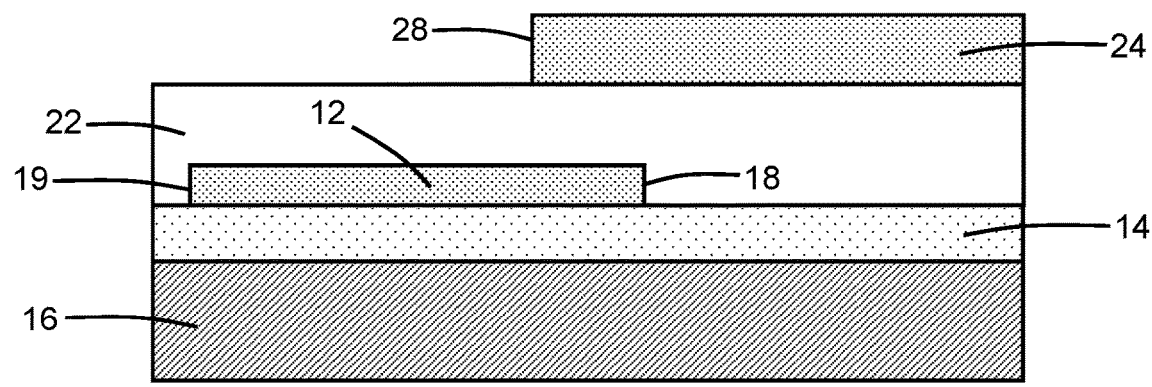
FIG. 4 is a cross-sectional view taken generally along line 4-4 in FIG. 3.

With reference to FIGS. 3, 4 in which like reference numerals refer to like features in FIGS. 1, 2 and at a subsequent fabrication stage, a dielectric layer 22 may be formed over the waveguide core 12. The dielectric layer 22 may be comprised of a dielectric material, such as silicon dioxide, having a lower refractive index than the waveguide core 12. The waveguide core 12 may be embedded in the dielectric material of the dielectric layer 22.

A waveguide core 24 is disposed on, and over, the dielectric layer 22. In an embodiment, the waveguide core 24 may be comprised of a material having a refractive index that is greater than the refractive index of silicon dioxide. In an embodiment, the waveguide core 24 may be comprised of a dielectric material, such as silicon nitride, silicon oxynitride, or aluminum nitride. In an alternative embodiment, the waveguide core 24 may be comprised of a semiconductor material, such as polycrystalline silicon (i.e., polysilicon) or amorphous silicon. In an embodiment, the waveguide core 24 may be formed by depositing a layer comprised of its constituent material (e.g., silicon nitride) and patterning the deposited layer with lithography and etching processes.

The waveguide core 24 may be terminated by a tapered section 26 having an end 28. The tapered section 26 of the waveguide core 24 may have an overlapping relationship with the tapered section 20 of the waveguide core 12. The tapered section 26 extends lengthwise along a longitudinal axis 31 with a width dimension that increases with increasing distance along the longitudinal axis 31 from the end 28. In an embodiment, the longitudinal axis 31 may be aligned collinear with the longitudinal axis 21. In an embodiment, the width dimension of the tapered section 26 may increase linearly with increasing distance from the end 28. In an alternative embodiment, the width dimension of the tapered section 26 may vary based on a non-linear function, such as a quadratic function, a cubic function, a parabolic function, a sine function, a cosine function, a Bezier function, or an exponential function. In an embodiment, the tapered section 26 may include a single stage of tapering characterized by a taper angle. In an alternative embodiment, the tapered section 26 may taper in multiple stages each characterized by a different taper angle.

The tapered section 26 of the waveguide core 24 is configured to receive light transferred from the tapered section 20 of the waveguide core 12. In an alternative embodiment, the waveguide core 24 may lack the tapered section 26, and the waveguide core 24 may instead include a section of constant width that terminates at the end 28 and that overlaps with the tapered section 20 of the waveguide core 12 for light transfer. In an alternative embodiment, the waveguide core 12 may lack the tapered section 20 and end 28, and instead may extend with constant width longitudinally beneath the waveguide core 24 such that the tapered section 26 of the waveguide core 24 overlaps a portion of the constant-width waveguide core 12. In an alternative embodiment, the waveguide core 12 may be shortened such that the tapered section 26 of the waveguide core 24 has a non-overlapping relationship with the tapered section 20 of the waveguide core 12. In an alternative embodiment, the waveguide core 24 may be integrated into a passive photonic component, such as a Mach-Zehnder interferometer, of greater complexity.

Figure 5:
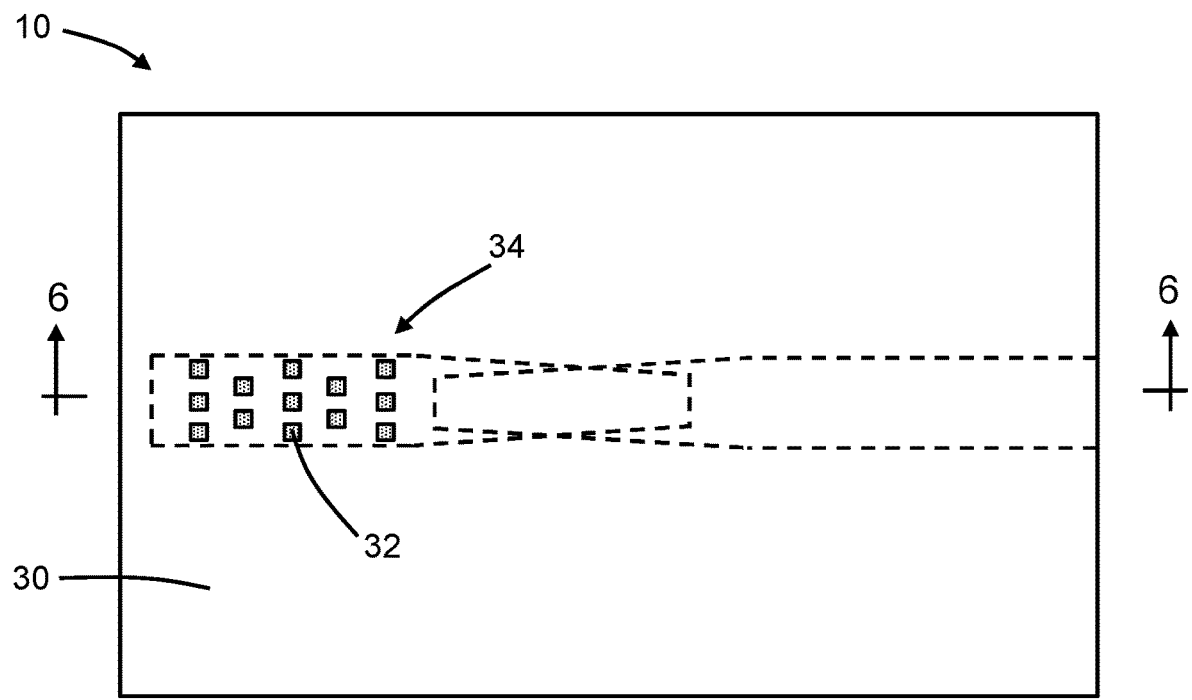
FIG. 5 is a top view of the structure at a fabrication stage of the processing method subsequent to FIGS. 3, 4.
Figure 6:
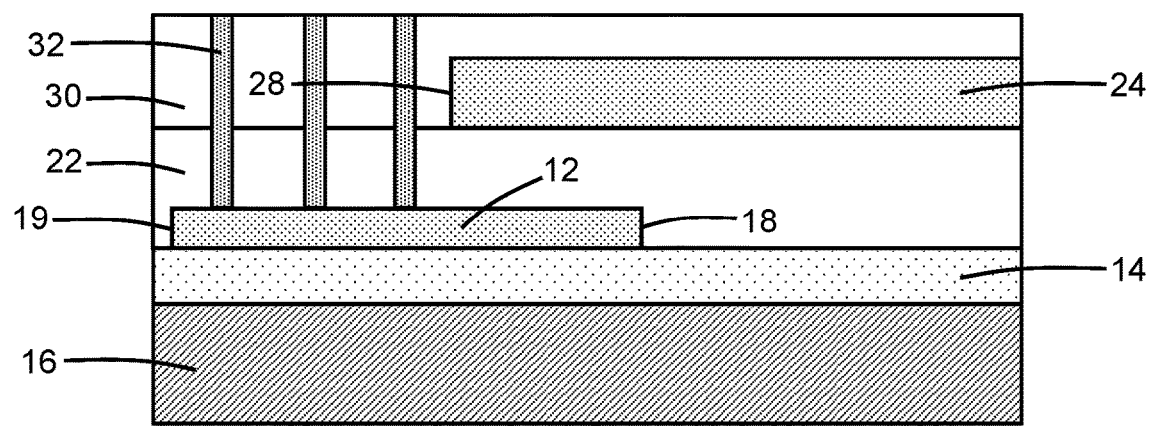
FIG. 6 is a cross-sectional view taken generally along line 6-6 in FIG. 5.

With reference to FIGS. 5, 6 in which like reference numerals refer to like features in FIGS. 3, 4 and at a subsequent fabrication stage, a dielectric layer 30 may be formed over the waveguide core 24. The dielectric layer 30 may be comprised of a dielectric material, such as silicon dioxide, having a lower refractive index than the waveguide core 24. The waveguide core 24 may be embedded in the dielectric material of the dielectric layer 30.

A reflector 34 includes contacts 32 that are disposed over a portion of the waveguide core 12 adjacent to the end 28 of the waveguide core 24. The contacts 32 penetrate through the dielectric layer 22 and the dielectric layer 30 over the portion of the waveguide core 12. In an embodiment, the contacts 32 may adjoin the portion of the waveguide core 12. The contacts 32 are longitudinally spaced along the waveguide core 12 from the overlapped tapered sections 20, 26. The contacts 32 are disposed between the opposite ends 18, 19 of the waveguide core 12, and the contacts 32 may be disposed between the end 19 of the waveguide core 12 and the end 28 of the waveguide core 24.

The contacts 32 may be comprised of a metal, such as tungsten, that is formed in openings patterned in the dielectric layer 22 and the dielectric layer 30. In alternative embodiments, the contacts 32 may be comprised of copper, aluminum, or another CMOS-compatible material. In alternative embodiments, the contacts 32 may be comprised of gold, silver, or another CMOS-incompatible material.

The contacts 32 of the reflector 34 may provide efficient reflection of light propagating in the waveguide core 12 and/or the waveguide core 24. In an embodiment, the contacts 32 may be arranged in a pattern that includes multiple rows. In an embodiment, the contacts 32 may have a regular pattern layout with a uniform spacing between adjacent contacts 32. In an embodiment, the contacts 32 may have an irregular pattern layout in which adjacent contacts 32 are separated by an unequal spacing. In an embodiment, the contacts 32 in alternating rows of the pattern may be staggered with an offset that repeats for adjacent pairs of rows. Additional dielectric layers (not shown) may be formed over the dielectric layer 30. In an alternative embodiment, a metal feature may be formed on the dielectric layer 30 as a sheet that connects the upper portions of the contacts 32.

In use, light propagating in the waveguide core 24 may be coupled to the waveguide core 12 by the overlapped tapered sections 20, 26. All or a portion of the light propagating in the waveguide core 12 may be reflected by the contacts 32 in a reverse direction and propagate in the waveguide core 12 toward the tapered section 26. The reflected light propagating in the waveguide core 24 may be coupled to the waveguide core 12 by the overlapped tapered sections 20, 26 and propagate in the waveguide core 24 away from the tapered section 26.

The reflection of light by the contacts 32 of the reflector 34 may be characterized by a high efficiency. The high reflection efficiency may permit the reflector 34 to be more compact than conventional reflectors or mirrors. The reflector 34 may exhibit broadband reflectivity with low dispersion for a wide range of operational wavelengths. The contacts 32 of the reflector 34 may be non-contacted vias that are not coupled to an electrical signal or to power.

Figure 7:
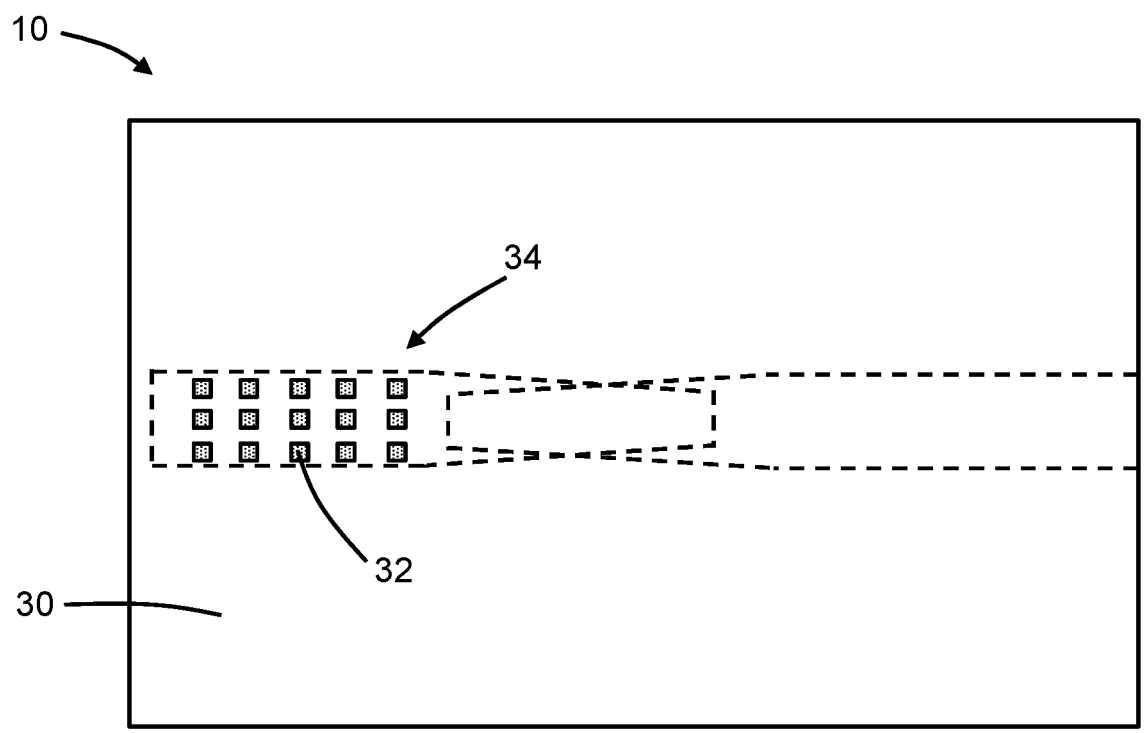
FIG. 7 is a top view of a structure in accordance with alternative embodiments of the invention.

With reference to FIG. 7 in which like reference numerals refer to like features in FIG. 5 and in accordance with alternative embodiments, the structure 10 may be modified such that the contacts 32 of the reflector 34 are arranged in a two-dimensional array of rows and columns in which the contacts 32 in adjacent rows lack staggering. Instead, the two-dimensional array of rows and columns defines a regular pattern for the contacts 32.

Figure 8:
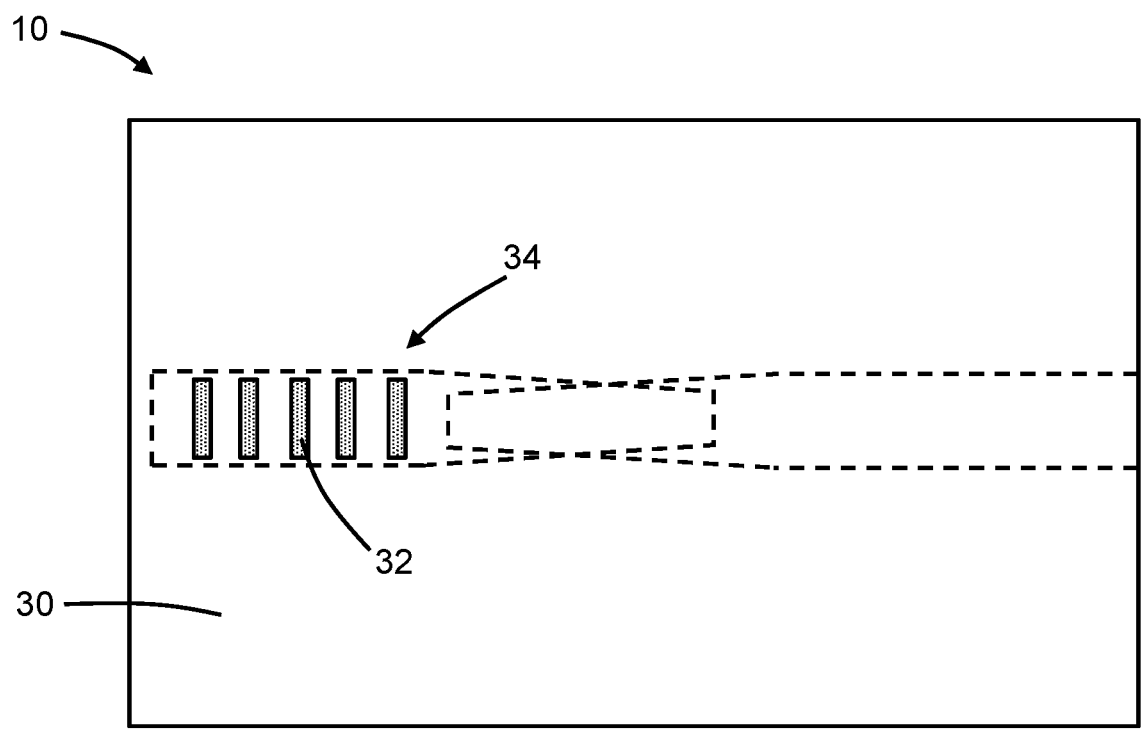
FIG. 8 is a top view of a structure in accordance with alternative embodiments of the invention.

With reference to FIG. 8 in which like reference numerals refer to like features in FIG. 5 and in accordance with alternative embodiments, the structure 10 may be modified such that the contacts 32 of the reflector 34 are elongated bars arranged in a one-dimensional array. In an embodiment, the bars providing the contacts 32 may be lengthwise aligned transverse to the longitudinal axis 31 of the tapered section 26.

Figure 9:
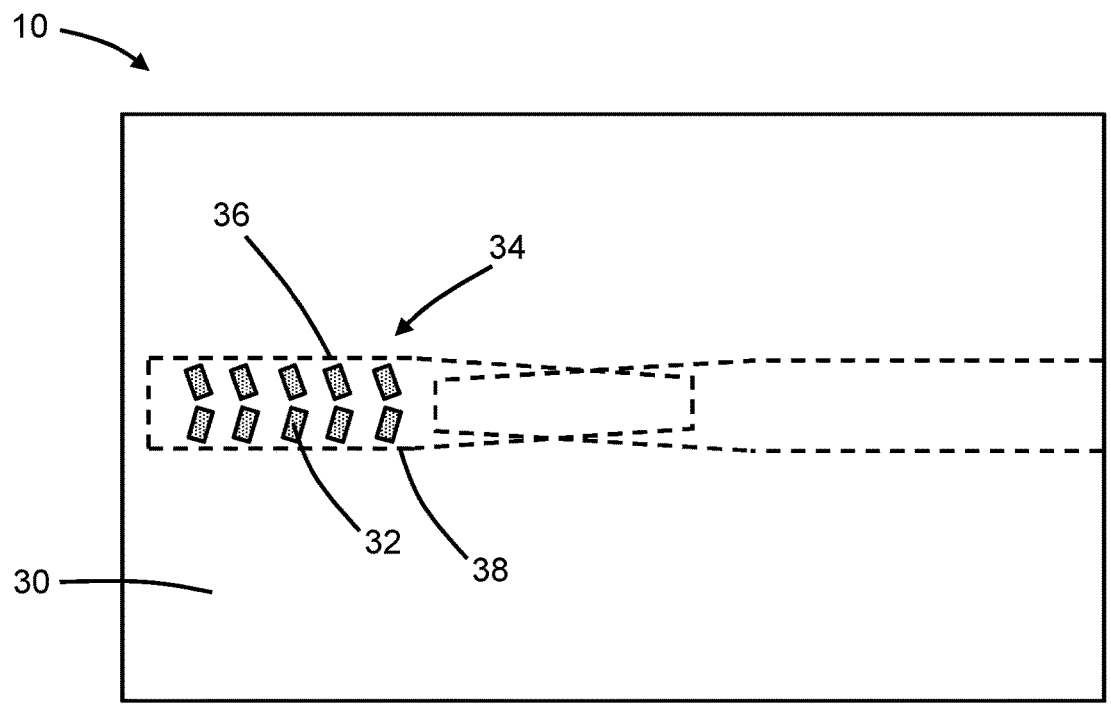
FIG. 9 is a top view of a structure in accordance with alternative embodiments of the invention.

With reference to FIG. 9 in which like reference numerals refer to like features in FIG. 5 and in accordance with alternative embodiments, a first set of the contacts 32 of the reflector 34 may have a surface normal angled at an acute angle relative to the longitudinal axis 21 of the waveguide core 12, and a second set of the contacts 32 of the reflector 34 may have a surface normal angled at an acute angle relative to the longitudinal axis 21 of the waveguide core 12. The acute angles of the different sets of the contacts 32 may differ and, in particular, one of the acute angles may be a positive angle (for example, plus) 20°, the other of the acute angles may be a negative angle (for example, minus) 20°, and the absolute values of the acute angles may be equal. Light propagating in the waveguide core 12 may be reflected laterally by the sets of contacts 32 toward the opposite sidewalls 36, 38 of the waveguide core 12 instead of being reflected in a reverse direction back toward the waveguide core 24. In an embodiment, the contacts 32 in each set may be disposed in a row, and the rows of contacts 32 may be arranged parallel to each other.

Figure 10:
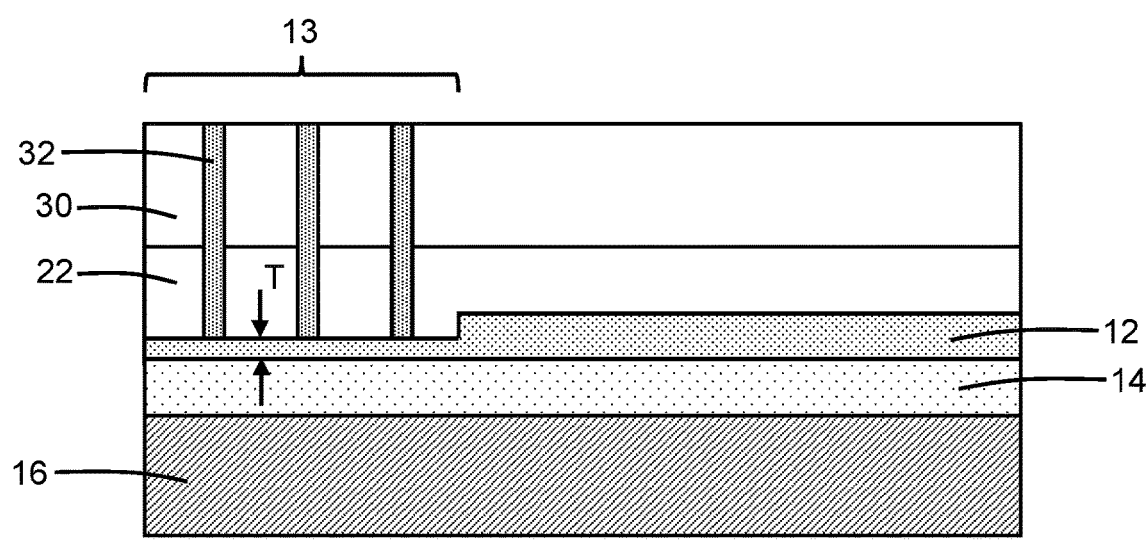
FIG. 10 is a cross-sectional view of a structure in accordance with alternative embodiments of the invention.

With reference to FIG. 10 in which like reference numerals refer to like features in FIG. 6 and in accordance with alternative embodiments, the waveguide core 24 may be omitted, the tapered section 20 of the waveguide core 12 may be omitted, and the waveguide core 12 may include a section 13 that has a reduced thickness T relative to the remainder of the waveguide core 12. The contacts 32 of the reflector 34 may be disposed over the thinned section 13 of the waveguide core 12 and, in an embodiment, the contacts 32 may adjoin the thinned section 13. The thinned section 13 may be formed by lithography and etching processes when patterning the waveguide core 12.

Figure 11:
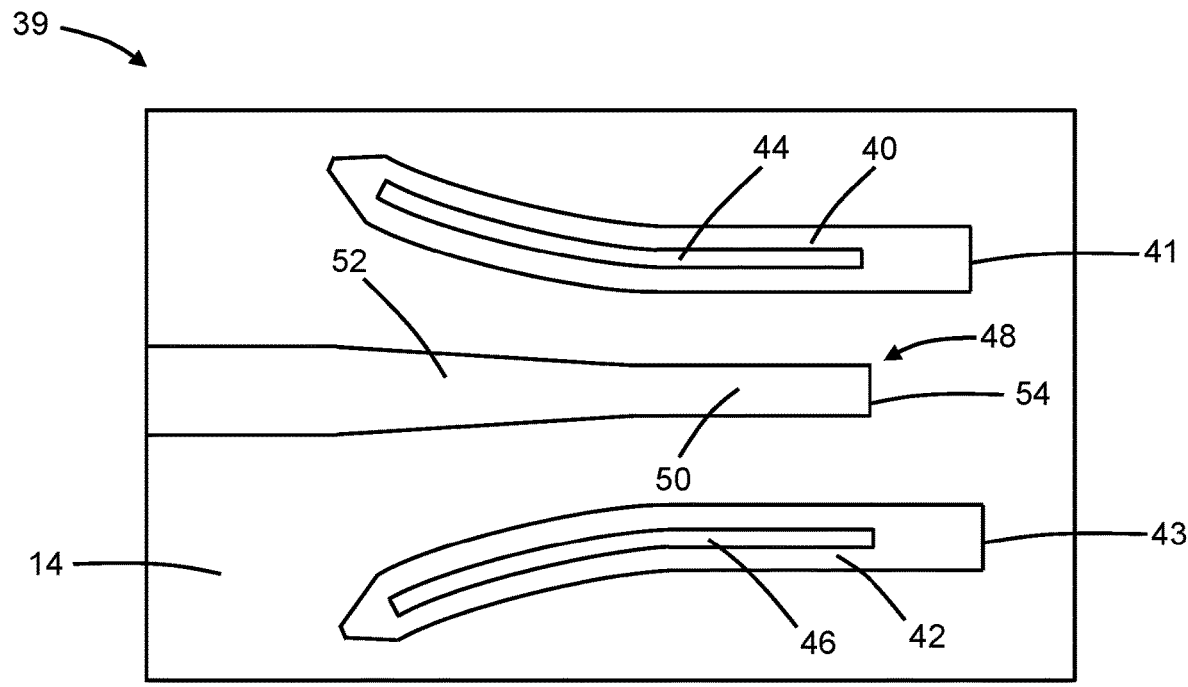
FIG. 11 is a top view of a structure at an initial fabrication stage in accordance with alternative embodiments of the invention.

With reference to FIG. 11 and in accordance with alternative embodiments, a structure 39 may include a waveguide core 40, a waveguide core 42, a semiconductor layer 44 disposed on the waveguide core 40, a semiconductor layer 46 disposed on the waveguide core 42, and a waveguide core 48 that includes a tapered section 50 that is disposed in a lateral direction between the waveguide core 40 and the waveguide core 42. The waveguide core 40, waveguide core 42, and waveguide core 48 may be comprised of the same material, such as silicon. The waveguide core 40 may terminate at an end 41, and the waveguide core 42 may terminate at an end 43. The waveguide core 48 may include a non-tapered section 52 that is appended to the tapered section 50 and that terminates at an end 54.

The semiconductor layers 44, 46 may be comprised of a light-absorbing material that generates charge carriers from photons of absorbed light by the photoelectric effect. In an embodiment, the semiconductor layers 44, 46 may be comprised of a material having a composition that includes germanium. In an embodiment, the semiconductor layers 44, 46 may be comprised of polycrystalline germanium, amorphous germanium, or doped germanium. In an alternative embodiment, the semiconductor layers 44, 46 may be comprised of silicon. The semiconductor layers 44, 46 may be formed by an epitaxial growth process. In an embodiment, the semiconductor layers 44, 46 may be epitaxially grown inside respective trenches that are patterned in the waveguide cores 40, 42.

Light may be coupled from the tapered section 50 of the waveguide core 48 to the waveguide core 40 and to the waveguide core 42. Each of the waveguide cores 40, 42 may include a curved leading section that provides a smooth transition for adiabatic coupling of the light from the tapered section 50 of the waveguide core 48 to the waveguide cores 40, 42. In alternative embodiments, the waveguide cores 40, 42 may include doped regions that provide an anode and cathode of a PIN photodetector or an avalanche photodetector. In alternative an embodiment, the waveguide core 42 and semiconductor layer 46 may be omitted from the structure 39 leaving only the waveguide core 40 and semiconductor layer 44 adjacent to the tapered section 50 of the waveguide core 48.

Figure 12:
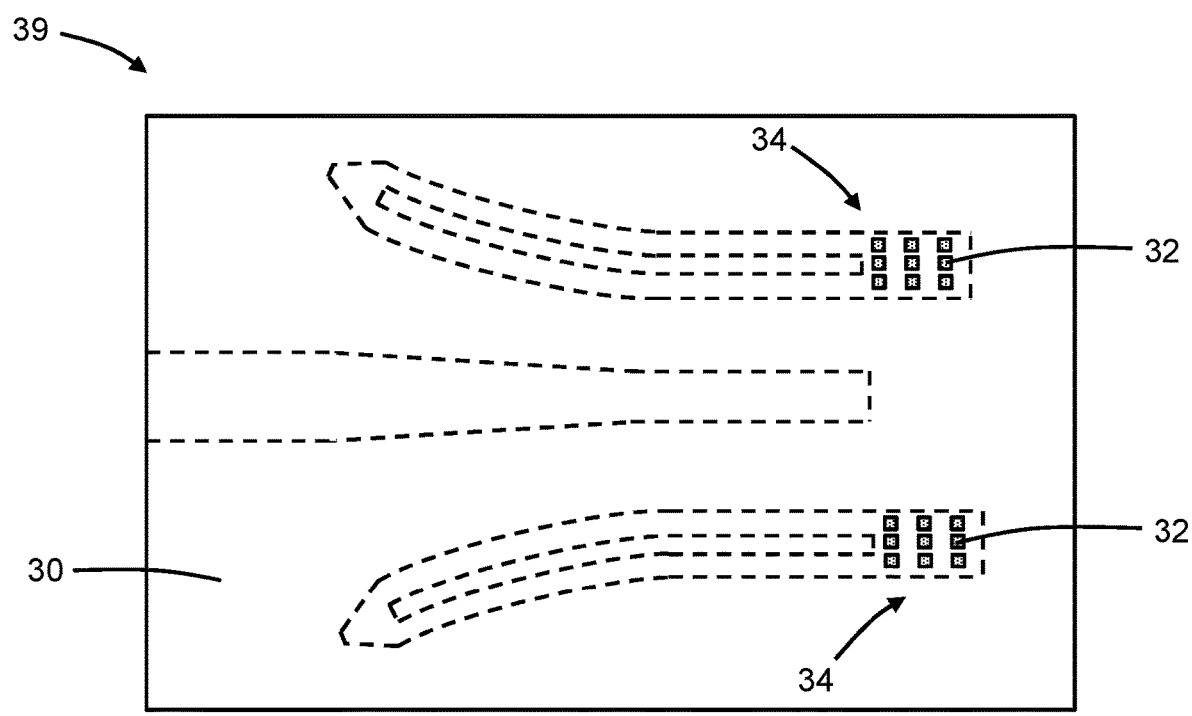
FIG. 12 is a top view of the structure at a fabrication stage of the processing method subsequent to FIG. 11.

With reference to FIG. 12 in which like reference numerals refer to like features in FIG. 11 and at a subsequent fabrication stage, an instance of the reflector 34 may be associated with the waveguide core 40, and an instance of the reflector 34 may be associated with the waveguide core 42. The contacts 32 of the one of the reflectors 34 may be disposed over a portion of the waveguide core 40 that is adjacent to the semiconductor layer 44 and between the end 41 and the semiconductor layer 44. The contacts 32 of the other of the reflectors 34 may be disposed over a portion of the waveguide core 42 that is adjacent to the semiconductor layer 46 and between the end 43 and the semiconductor layer 46. In an embodiment, the contacts 32 may adjoin the respective portions of the waveguide cores 40, 42.

In use, light propagating in the waveguide core 48 may be coupled laterally from the tapered section 50 of the waveguide core 48 to the waveguide core 40 and coupled laterally from the tapered section 50 of the waveguide core 48 to the waveguide core 42. A portion of the light is absorbed by the semiconductor layer 44. Light that is not absorbed by the semiconductor layer 44 may be reflected by the contacts 32 of the instance of the reflector 34 associated with the waveguide core 40 back toward the semiconductor layer 44 for absorption. A portion of the light is absorbed by the semiconductor layer 46. Light that is not absorbed by the semiconductor layer 46 may be reflected by the contacts 32 of the instance of the reflector 34 associated with the waveguide core 42 back toward the semiconductor layer 46 for absorption. The addition of the instances of the reflector 34 may be effective to improve the efficiency of light absorption by the semiconductor layers 44, 46.

Figure 13:
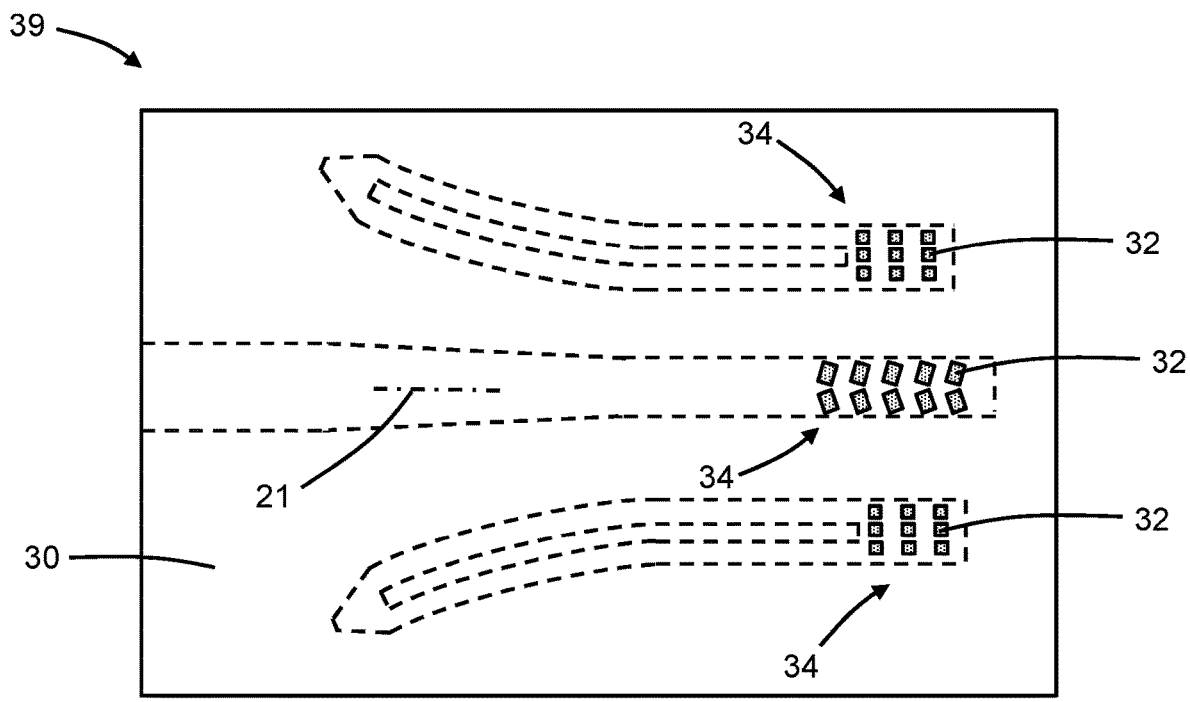
FIG. 13 is a top view of a structure in accordance with alternative embodiments of the invention.

With reference to FIG. 13 in which like reference numerals refer to like features in FIG. 12 and in accordance with alternative embodiments, an instance of the reflector 34 may be associated with the waveguide core 48. In an embodiment, the instance of the reflector 34 may be added in addition to the instances of the reflector 34 associated with the waveguide cores 40, 42. The contacts 32 of the reflector 34 may be disposed over a portion of the section 52 of the waveguide core 48 and adjacent to the terminating end 54. The reflector 34 may be configured with contacts 32 that are angled to reflect light propagating in the appended portion of the waveguide core 48 to each of the waveguide cores 40, 42.

Figure 14:
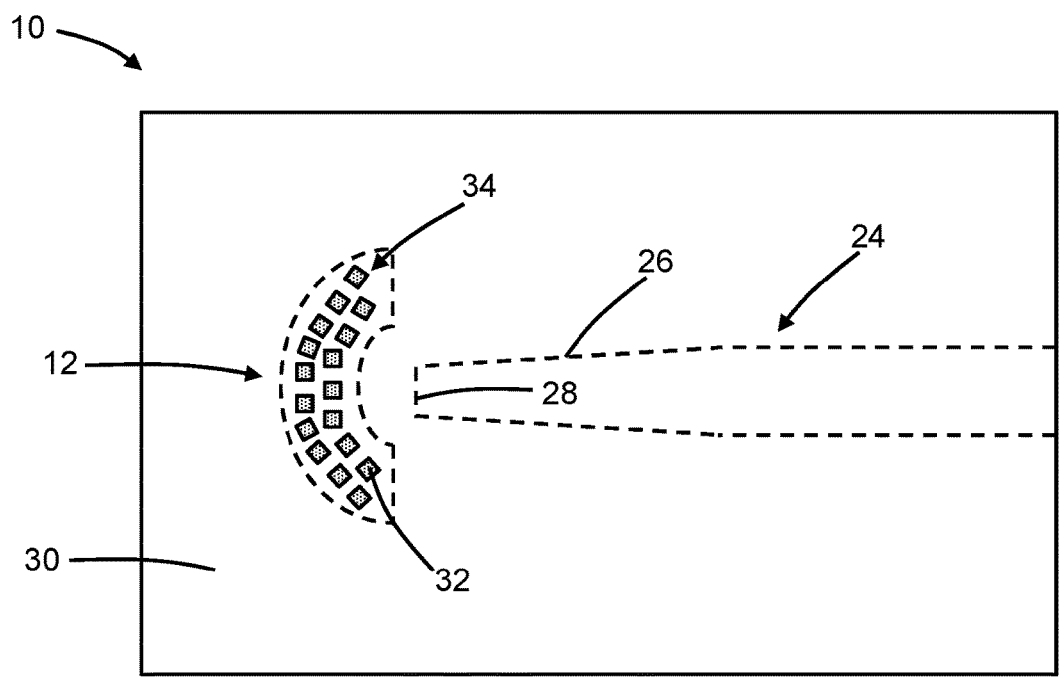
FIG. 14 is top view of a structure in accordance with alternative embodiments of the invention.

With reference to FIG. 14 and in accordance with alternative embodiments, the waveguide core 12 may be shaped as a bend that is disposed adjacent to the end 28 of the tapered section 26 of the waveguide core 24. The contacts 32 of the reflector 34 are arranged to land on the bend and, for that reason, have a generally curved arrangement.

Figure 15:
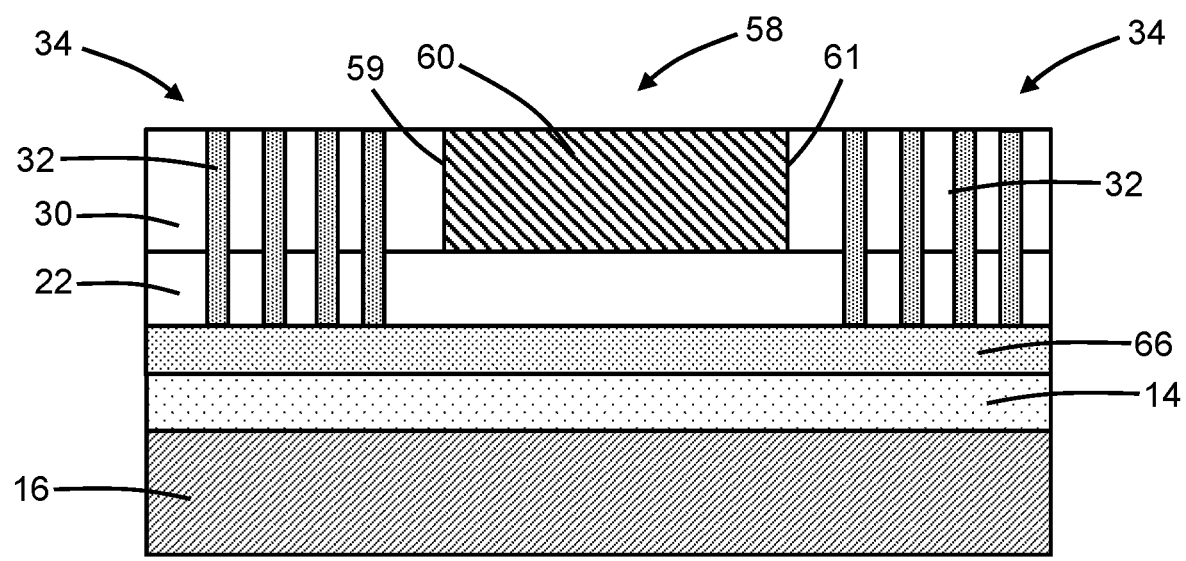
FIG. 15 is cross-sectional view of a structure in accordance with alternative embodiments of the invention.

With reference to FIG. 15 and in accordance with alternative embodiments, instances of the reflector 34 may be used in conjunction with a Fabry-Perot laser diode 58. In that regard, the Fabry-Perot laser diode 58 may include a gain medium 60 that is arranged between the different instances of the reflector 34. In an alternative embodiment, only one of the instances of the reflector 34 may be disposed adjacent to the gain medium 60 of the Fabry-Perot laser diode 58.

The gain medium 60 of the Fabry-Perot laser diode 58 is terminated at an end 59 and an end 61 that is opposite from the end 59. The contacts 32 of one of the instances of the reflector 34 may be disposed over a portion of a waveguide core 66 adjacent to the end 59 of the gain medium 60, and the contacts 32 of the other of the instances of the reflector 34 may be disposed over another portion of the waveguide core 66 adjacent to the end 61 of the gain medium 60. The waveguide core 66 may be comprised of, for example, single-crystal silicon, and may be configured to receive light generated by the gain medium 60 of the Fabry-Perot laser diode 58.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A photonics chip structure comprising:
a first waveguide core;
a second waveguide core adjacent to the first waveguide core, the second waveguide core configured to couple light to the first waveguide core, and the second waveguide core having a terminating end; and
a first reflector including a first plurality of metal contacts over a first portion of the first waveguide core adjacent to the terminating end of the second waveguide core, the first plurality of metal contacts configured to reflect the light.

2. A photonics chip structure comprising:
a first waveguide core;
a second waveguide core adjacent to the first waveguide core, the second waveguide core configured to couple light to the first waveguide core;
a reflector including a plurality of metal contacts over a first portion of the first waveguide core, the plurality of metal contacts configured to reflect the light; and
a dielectric layer over the first waveguide core,
wherein the plurality of metal contacts are disposed in the dielectric layer.

3. The photonics chip structure of claim 1 wherein the first plurality of metal contacts adjoin the first portion of the first waveguide core, and the first waveguide core has a second portion adjacent to the first portion.

4. The photonics chip structure of claim 3 wherein the second waveguide core includes a portion that overlaps with the second portion of the first waveguide core.

5. The photonics chip structure of claim 1 wherein the first plurality of metal contacts are non-contacted vias.

6. A photonics chip structure comprising:
a first waveguide core;
a second waveguide core adjacent to the first waveguide core, the second waveguide core configured to couple light to the first waveguide core;
a first reflector including a first plurality of metal contacts over a portion of the first waveguide core, the first plurality of metal contacts configured to reflect the light; and a first semiconductor layer on the first waveguide core, the first semiconductor layer comprising a light-absorbing material.

7. The photonics chip structure of claim 6 wherein the first waveguide core has a terminating end, and the first plurality of metal contacts are disposed between the first semiconductor layer and the terminating end of the first waveguide core.

8. The photonics chip structure of claim 6 further comprising:
a third waveguide core,
wherein the second waveguide core is laterally disposed between the first waveguide core and the third waveguide core, and the second waveguide core is further configured to couple the light to the third waveguide core.

9. The photonics chip structure of claim 8 further comprising:
a second reflector including a second plurality of metal contacts over a portion of the third waveguide core, the first plurality of metal contacts configured to reflect the light.

10. The photonics chip structure of claim 9 further comprising:
a second semiconductor layer on the third waveguide core, the second semiconductor layer comprising the light-absorbing material.

11. The photonics chip structure of claim 10 wherein the third waveguide core has a terminating end, and the second plurality of metal contacts are disposed between the second semiconductor layer and the terminating end of the third waveguide core.

12. The photonics chip structure of claim 6 further comprising:
a second reflector including a second plurality of metal contacts over a portion of the second waveguide core, the second plurality of metal contacts configured to reflect the light.

13. The photonics chip structure of claim 1 wherein the first plurality of metal contacts are disposed in an irregular pattern layout.

14. The photonics chip structure of claim 1 wherein the first plurality of metal contacts are disposed in a regular pattern layout.

15. The photonics chip structure of claim 1 wherein the second waveguide core is laterally adjacent to the first waveguide core.

16. The photonics chip structure of claim 1 wherein the first waveguide core has a longitudinal axis, the first plurality of metal contacts are angled at a first acute angle relative to the longitudinal axis, and the first reflector includes a second plurality of metal contacts that angled at a second acute angle relative to the longitudinal axis.

17. The photonics chip structure of claim 1 further comprising:
a dielectric layer over the first waveguide core,
wherein the first plurality of metal contacts are disposed in the dielectric layer.

18. The photonics chip structure of claim 2 wherein the plurality of metal contacts adjoin the first portion of the first waveguide core, and the first waveguide core has a second portion adjacent to the first portion.

19. The photonics chip structure of claim 18 wherein the second waveguide core includes a portion that overlaps with the second portion of the first waveguide core.

20. The photonics chip structure of claim 6 further comprising:
a dielectric layer over the first waveguide core,
wherein the first plurality of metal contacts are disposed in the dielectric layer.

* * * * *